United States Patent
Kim

(10) Patent No.: US 9,888,043 B2
(45) Date of Patent: Feb. 6, 2018

(54) METHOD FOR PROVIDING VOICE COMMUNICATION SERVICE AND ELECTRONIC DEVICE THEREOF

(71) Applicant: Samsung Electronics Co., Ltd., Gyeonggi-do (KR)

(72) Inventor: Hye-Jeong Kim, Gyeonggi-do (KR)

(73) Assignee: Samsung Electronics Co., Ltd (KR)

(*) Notice: Subject to any disclaimer, the term of this patent is extended or adjusted under 35 U.S.C. 154(b) by 531 days.

(21) Appl. No.: 14/488,915

(22) Filed: Sep. 17, 2014

(65) Prior Publication Data

US 2015/0078337 A1 Mar. 19, 2015

(30) Foreign Application Priority Data

Sep. 17, 2013 (KR) .................. 10-2013-0112131

(51) Int. Cl.
*H04L 29/06* (2006.01)
*H04W 36/00* (2009.01)

(52) U.S. Cl.
CPC ...... *H04L 65/1069* (2013.01); *H04L 65/1083* (2013.01); *H04W 36/0022* (2013.01)

(58) Field of Classification Search
None
See application file for complete search history.

(56) References Cited

U.S. PATENT DOCUMENTS

| | | | | |
|---|---|---|---|---|
| 2010/0323705 A1* | 12/2010 | Iwamura | ............... | H04W 88/16 455/440 |
| 2011/0002327 A1* | 1/2011 | Dwyer | ............... | H04W 48/18 370/352 |
| 2012/0106324 A1* | 5/2012 | Keller | ............... | H04W 8/20 370/225 |
| 2012/0224563 A1* | 9/2012 | Zisimopoulos | ......... | H04W 8/22 370/331 |
| 2013/0034080 A1* | 2/2013 | Yang | ............... | H04W 36/0055 370/331 |
| 2013/0039267 A1 | 2/2013 | Xie | | |
| 2014/0066055 A1* | 3/2014 | Balakrishnan | ........ | H04W 48/18 455/432.1 |

* cited by examiner

*Primary Examiner* — Robert M Morlan
(74) *Attorney, Agent, or Firm* — The Farrell Law Firm, P.C.

(57) ABSTRACT

An apparatus and a method for providing a voice communication service using a Long Term Evolution (LTE) network in an electronic device are provided. A method includes providing a first Voice over LTE (VoLTE) service in a first LTE area, handing over to a second LTE area during the first VoLTE service, when the first VoLTE service ends, determining whether the second LTE area provides a VoLTE service, and when the second VoLTE area does not provide the VoLTE service, limiting the VoLTE service of the electronic device.

18 Claims, 15 Drawing Sheets

METHOD FOR PROVIDING VOICE COMMUNICATION SERVICE AND ELECTRONIC DEVICE THEREOF

PRIORITY

This application claims priority under 35 U.S.C. §119(a) to a Korean Patent Application filed in the Korean Intellectual Property Office on Sep. 17, 2013, and assigned Serial No. 10-2013-0112131, the entire content of which is incorporated herein by reference.

BACKGROUND OF THE INVENTION

1. Field of the Invention

The present invention generally relates to a method for providing a voice communication service using a Long Term Evolution (LTE) network and an electronic device thereof.

2. Description of the Related Art

A Long Term Evolution (LTE) network can support Voice over LTE (VoLTE), which is a Packet-Switched (PS) voice service. Accordingly, an electronic device supporting LTE service can provide the PS voice service in an LTE service area using the VoLTE service. Outside the LTE service area during the VoLTE service, the electronic device cannot maintain the PS voice service and thus can lose the VoLTE service.

To address the issue of interrupted VoLTE service, the LTE standard provides Single Radio Voice Call Continuity (SRVCC) for continuing the voice service by handing over the VoLTE service to a Circuit-Switched (CS) legacy network.

When the electronic device providing the VoLTE service receives an LTE signal whose strength is lower than a threshold, over the LTE network, the SRVCC can be triggered to continue the voice service of the electronic device. For example, the LTE network can trigger the SRVCC to maintain the voice service of the electronic device when the electronic device providing the VoLTE service cannot discover the LTE network for the handover. When the electronic device providing the VoLTE service in a serving LTE network area supporting the VoLTE moves to another LTE network area not supporting the VoLTE, the serving LTE network can determine that the electronic device can access the other LTE network, and triggers the LTE handover to the other LTE network, without triggering the SRVCC. As a result, the VoLTE service is disconnected.

SUMMARY OF THE INVENTION

The present invention has been made to solve at least the above-mentioned problems and/or disadvantages and to provide at least the advantages described below. Accordingly, an aspect of the present invention is to provide an apparatus and a method for providing a voice communication service using an LTE network.

Another aspect of the present invention is to provide an apparatus and a method for maintaining a voice communication service of an electronic device which enters a non-VoLTE area.

Another aspect of the present invention is to provide an apparatus and a method for triggering SRVCC in a Base Station (BS) when an electronic device enters a non-VoLTE area.

Another aspect of the present invention is to provide an apparatus and a method for recognizing a non-VoLTE area in a BS using a handover response message received from a target BS.

Another aspect of the present invention is to provide an apparatus and a method for maintaining a VoLTE service of a terminal in a BS which enters a non-VoLTE area.

Another aspect of the present invention is to provide an apparatus and a method for maintaining a VoLTE service in a non-VoLTE area in an electronic device.

According to an aspect of the present invention, a method for operating an electronic device is provided, which includes providing a first Voice over Long Term Evolution (LTE) (VoLTE) service in a first LTE area; handing over to a second LTE area during the first VoLTE service; when the first VoLTE service ends, determining whether the second LTE area provides a VoLTE service; and when the second VoLTE area does not provide the VoLTE service, limiting the VoLTE service of the electronic device.

According to another aspect of the present invention, an electronic device is provided, which includes a communication module configured to provide a communication service via an LTE network; and a processor configured to hand over from a first LTE area to a second LTE area during a first VoLTE service using the communication module, determining whether the second LTE area provides a VoLTE service when the first VoLTE service ends, and limiting the VoLTE service when the second VoLTE area does not provide the VoLTE service.

BRIEF DESCRIPTION OF THE DRAWINGS

The above and other aspects, features, and advantages of certain embodiments of the present invention will be more apparent from the following description, taken in conjunction with the accompanying drawings, in which.

Throughout the drawings, like reference numerals will be understood to refer to like parts, components and structures.

DETAILED DESCRIPTION OF EMBODIMENTS OF THE PRESENT INVENTION

The following description with reference to the accompanying drawings is provided to assist in a comprehensive understanding of embodiments of the invention as defined by the claims and their equivalents. It includes various specific details to assist in that understanding but these are to be regarded as mere examples. Accordingly, those of ordinary skilled in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to their meanings in a dictionary, but, are merely used to enable a clear and consistent understanding of the invention. Accordingly, it should be apparent to those skilled in the art that the following description of embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, "a component surface" includes one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skilled in the art, may occur in amounts that do not preclude the effect the characteristic was intended to provide.

Embodiments of the present invention provide a technique for providing a voice communication service using an LTE network in an electronic device.

Hereinafter, the electronic device can include one or more of various devices such as, but not limited to, a smart phone supporting an LTE service, a tablet Personal Computer (PC), a mobile phone, a video phone, a netbook computer, a Personal Digital Assistant (PDA), a Portable Multimedia Player (PMP), an MP3 player, a camera, a wearable device, a wrist watch, a navigation device, a Global Positioning System (GPS) receiver, an Event Data Recorder (EDR), a Flight Data Recorder (FDR), an electronic dictionary, and a camcorder. The electronic device may be referred to as a terminal which travels in a service area of a BS and supports data service and voice service. The BS may include an evolved Node B (eNB).

Figure 1:
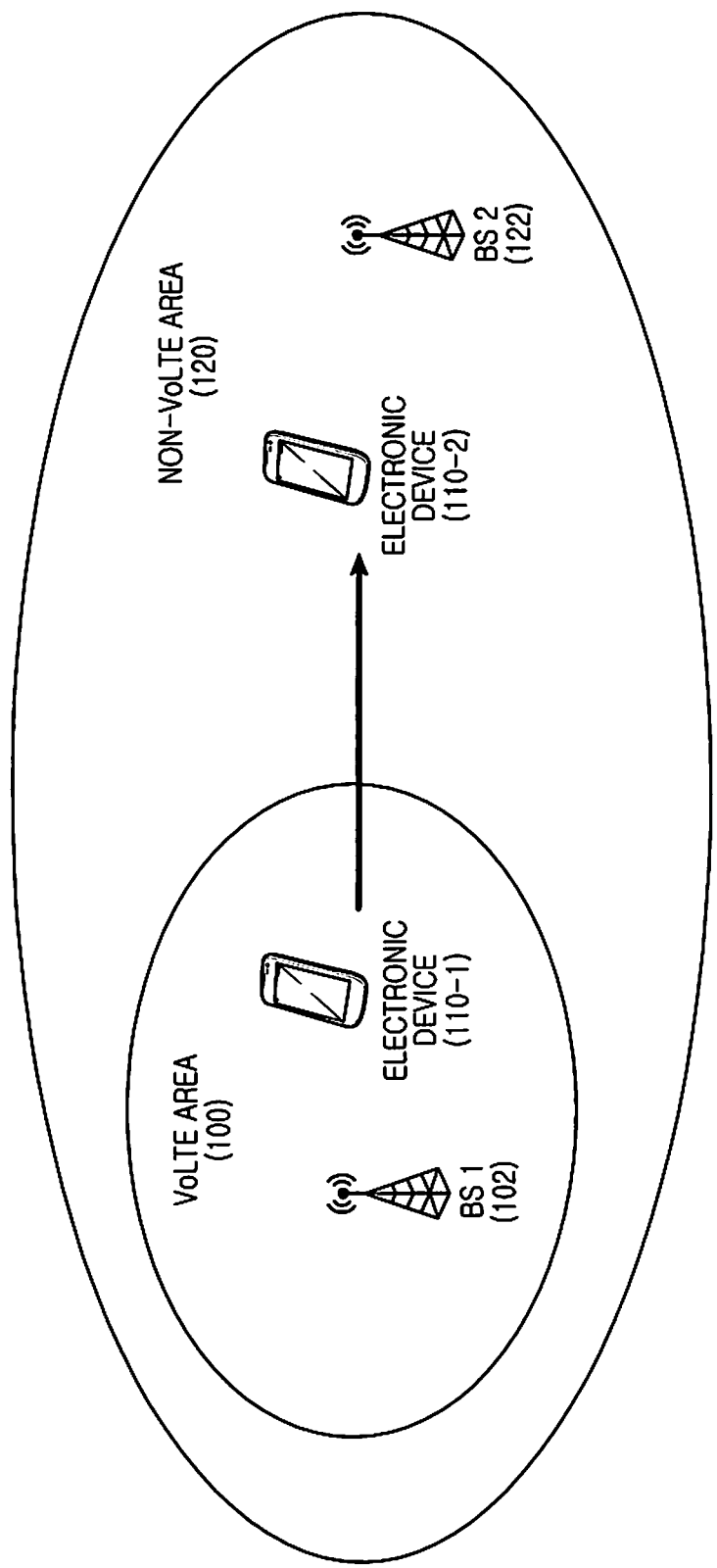
FIG. 1 illustrates a configuration of a wireless communication system according to an embodiment of the present invention.

FIG. 1 illustrates a wireless communication system according to an embodiment of the present invention.

Referring to FIG. 1, an LTE network includes an LTE area 100 (hereinafter, referred to as a VoLTE area) supporting a VoLTE service, and an LTE area 120 (hereinafter, referred to as a non-VoLTE area) not supporting the VoLTE service.

In the VoLTE area 100, an electronic device 110-1 supporting an LTE service can support a VoLTE service by accessing the LTE network via a first BS 102.

When the electronic device 110-1 moves to the non-VoLTE area 120, as indicated by the electronic device 110-2, during the VoLTE service, the first BS 102 triggers SRVCC for the electronic device 110 using neighboring Inter-Radio Access Technology (IRAT) BS measurement information received from the electronic device 110-1. Here, the migration to the non-VoLTE area 120 can include handover to a second BS 122 of the non-VoLTE area 120 according to physical movement of the electronic device 110 or received signal strength of the electronic device 110.

While the non-VoLTE area 120 includes the VoLTE area 100 in the LTE network, the non-VoLTE area 120 and the VoLTE area 100 may not overlap each other.

Figure 2:
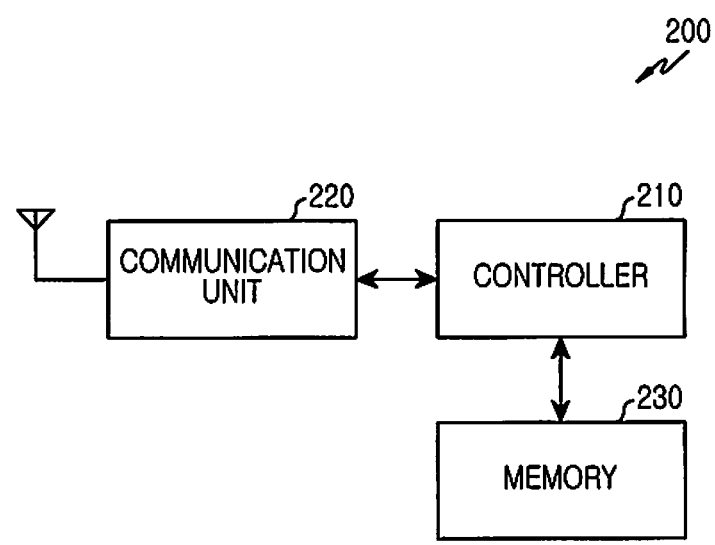
FIG. 2 illustrates a configuration of a BS according to an embodiment of the present invention.

FIG. 2 is a block diagram of a configuration of a BS according to an embodiment of the present invention.

Referring to FIG. 2, the BS 200 includes a controller 210, a communication unit 220, and a memory 230.

The controller 210 controls the BS 200 to provide the LTE service to one or more electronic devices. When the electronic device 110-1 in the VoLTE service moves to another LTE area (e.g., the non-VoLTE area 120), the controller 210 controls to continue the voice communication service of the electronic device.

For example, the controller 210 allocates a measurement resource (e.g., measurement GAP) for the VoLTE electronic devices to measure the signal strength of the neighboring IRAT BS. The controller 210 selects the LTE handover or the SRVCC of the VoLTE electronic device using the measurement information of the electronic device with the measurement resource and VoLTE support information of the neighboring BS stored in the memory 230. More specifically, when the electronic device in the VoLTE service moves to other VoLTE area, the controller 210 triggers the LTE handover of the electronic device. That is, the controller 210 controls the electronic device to perform the LTE handover to the other VoLTE area. By contrast, when the electronic device in the VoLTE service moves to a non-VoLTE area, the controller 210 triggers the SRVCC of the electronic device using the neighboring IRAT BS signal measurement information measured by the electronic device. That is, the controller 210 controls the electronic device to hand over to a legacy network according to the SRVCC. In such a way, the controller 210 recognizes whether the electronic device of the VoLTE service moves to the other VoLTE area or the non-VoLTE area, using the neighboring LTE BS signal measurement information measured by the electronic device and the neighboring BS VoLTE support information stored in the memory 230.

As another example, the controller 210 selects the LTE handover or the SRVCC of the VoLTE electronic device using the neighboring LTE BS signal measurement information received from the electronic device and the neighboring BS VoLTE support information stored in the memory 230. More specifically, when the VoLTE electronic device moves to the other VoLTE area, the controller 210 triggers the LTE handover of the electronic device. That is, the controller 210 controls the electronic device to perform the LTE handover to the other VoLTE area. When the VoLTE electronic device moves to the non-VoLTE area, the controller 210 allocates the measurement resource for measuring the neighboring IRAT BS signal strength of the VoLTE electronic device. The controller 210 then triggers the SRVCC of the electronic device using the neighboring LTE BS signal measurement information measured by the electronic device. That is, the controller 210 controls the electronic device to hand over to the legacy network according to the SRVCC.

As another example, the controller 210 allocates the measurement resource for the VoLTE electronic devices to measure the neighboring IRAT BS signal strength. Using the neighboring LTE BS signal measurement information measured by the electronic device, the controller 210 determines whether the VoLTE electronic device moves to the other LTE area. When the VoLTE electronic device moves to the other LTE area, the controller 210 requests the handover of the electronic device from the BS of the other LTE area. In such a way, based on a handover response signal received from the BS of the other LTE area, the controller 210 recognizes whether the VoLTE electronic device moves to the other LTE area or the non-VoLTE area. When the VoLTE electronic device moves to the other LTE area, the controller 210 triggers the LTE handover of the electronic device. By contrast, when the VoLTE electronic device moves to the non-VoLTE area, the controller 210 triggers the SRVCC of the electronic device using the neighboring IRAT BS signal measurement information measured by the electronic device.

As another example, the controller 210 allocates the measurement resource for the VoLTE electronic devices to measure the neighboring IRAT BS signal strength. Using the neighboring IRAT BS signal measurement information measured by the electronic device and the neighbor LTE BS measurement information, the controller 210 requests the handover of the electronic device from one or more BSs having the received signal strength of the electronic device exceeding a reference value. In such a way, the controller 210 selects one or more neighboring LTE BSs to request the handover of the electronic device using the neighboring LTE BS signal measurement information received from the electronic device, and selects one or more legacy BSs to request the handover of the electronic device using the neighboring IRAT BS signal measurement information received from the electronic device. When receiving the handover response signal accepting the handover of the electronic device from the BS of the other VoLTE area, the controller 210 controls the electronic device to conduct the LTE handover to the other VoLTE area. By contrast, when receiving the handover response signal accepting the handover of the electronic device only from the legacy BS, the controller 210 controls the electronic device to conduct the SRVCC to the legacy BS.

As another example, the controller 210 determines whether the VoLTE electronic device moves to the other LTE area, using the neighboring LTE BS signal measurement information received from the electronic device. When the VoLTE electronic device moves to the other LTE area, the controller 210 requests the handover of the electronic device from the BS of the other LTE area. In such a way, based on the handover response signal received from the BS of the other LTE area, the controller 210 recognizes whether the VoLTE electronic device moves to the other VoLTE area or the non-VoLTE area. When the VoLTE electronic device moves to the other VoLTE area, the controller 210 triggers the LTE handover of the electronic device. By contrast, when the VoLTE electronic device moves to the non-VoLTE area, the controller 210 allocates the measurement resource for measuring the signal strength of the neighboring IRAT BSs of the VoLTE electronic device. The controller 210 then triggers the SRVCC of the electronic device using the neighboring IRAT BS signal measurement information measured by the electronic device.

As another example, when the VoLTE electronic device moves to the non-VoLTE area, the controller 210 determines whether the non-VoLTE area supports the LTE handover. When the non-VoLTE area supports the LTE handover, the controller 210 controls the VoLTE electronic device to perform the LTE handover to the non-VoLTE area. In such as way, the controller 210 determines whether the SRVCC to the legacy BS is supported, based on characteristics of the current VoLTE service and the SRVCC support per service characteristic of the BS. When the non-VoLTE area does not support the SRVCC, the controller 210 determines whether the non-VoLTE area supports the LTE handover.

The communication unit 220 connects communication between one or more electronic devices and the BS 200, communication between other BS and the BS 200, or the communication between a core network and the BS 200.

The memory 230 stores data generated when the BS 200 is operated, and data for operating the BS 200. For example, the memory 230 stores the VoLTE support information of the neighboring BSs.

As described above, the controller 210 triggers the LTE handover or the SRVCC of the VoLTE electronic device in the single module.

Figure 3:
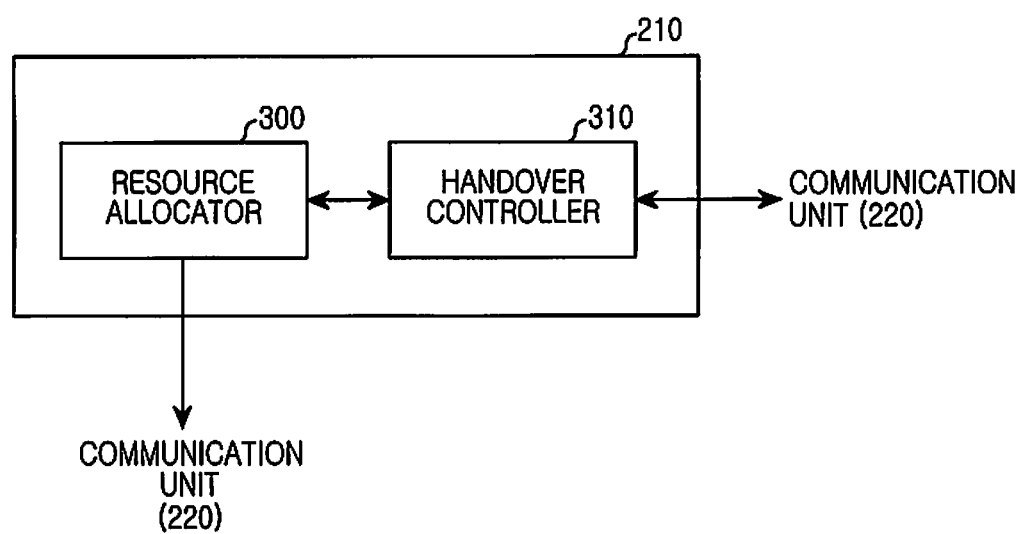
FIG. 3 illustrates a configuration of a controller in the BS according to an embodiment of the present invention.

Alternatively, the controller 210 may include separate modules for triggering the LTE handover or the SRVCC of the VoLTE electronic device as shown in FIG. 3.

FIG. 3 is a detailed block diagram of a configuration of the controller in the BS according to an embodiment of the present invention.

Referring to FIG. 3, the controller 210 includes a resource allocator 300 and a handover controller 310.

The resource allocator 300 allocates the resource for the electronic device in the service area of the BS 200 to measure the neighboring IRAT BS signal strength. For example, the resource allocator 300 allocates the measurement resource for the VoLTE electronic devices to continuously measure the neighboring IRAT BS signal strength. As another example, when the handover controller 310 recognizes that the VoLTE electronic device moves to the non-VoLTE area, the resource allocator 300 allocates the corresponding electronic device the resource for measuring the neighboring IRAT BS signal strength.

When the VoLTE electronic device moves to the other LTE area, the handover controller 310 can control to maintain the voice communication service of the electronic device.

For example, the handover controller 310 recognizes whether the electronic device of the VoLTE service moves to the other VoLTE area or the non-VoLTE area, using the neighboring LTE BS signal measurement information measured by the electronic device and the neighboring BS VoLTE support information stored in the memory 230. When the VoLTE electronic device moves to the other VoLTE area, the handover controller 310 triggers the LTE handover of the electronic device. By contrast, when the VoLTE electronic device moves to the non-VoLTE area, the handover controller 310 triggers the SRVCC of the electronic device using the neighboring IRAT BS signal measurement information measured by the electronic device. In such a way, the handover controller 310 controls the resource allocator 300 to allocate the measurement resource for measuring the neighboring IRAT BS signal strength, to the electronic device which moves to the non-VoLTE area, and controls to maintain the voice communication service of the electronic device.

As another example, the handover controller 310 determines whether the VoLTE electronic device moves to the other LTE area, using the neighboring LTE BS signal measurement information received from the electronic device. When the VoLTE electronic device moves to the other LTE area, the handover controller 310 requests the handover of the electronic device from the corresponding BS. When it is determined that VoLTE electronic device moves to the other LTE area based on the handover response signal received from the BS of the other LTE area, the handover controller 310 triggers the LTE handover of the electronic device. By contrast, when it is determined that VoLTE electronic device moves to the non-VoLTE area based on the handover response signal received from the BS of the other LTE area, the handover controller 310 triggers the SRVCC of the electronic device using the neighboring IRAT BS signal measurement information measured by the electronic device. In such a way, the handover controller 310 controls the resource allocator 300 to allocate the measurement resource for measuring the neighboring IRAT BS signal strength, to the electronic device migrating to the non-VoLTE area.

As another example, using the measurement information measured by the electronic device, the handover controller 310 requests the handover of the electronic device from one or more BSs having the received signal strength of the electronic device exceeding the reference value. In such a way, the handover controller 310 selects the neighboring LTE BS to request the handover of the electronic device using the neighboring LTE BS signal measurement information received from the electronic device, and selects the legacy BS to request the handover of the electronic device using the neighboring IRAT BS signal measurement information received from the electronic device. When receiving the handover response signal accepting the handover of the electronic device from the BS of the other VoLTE area, the handover controller 310 controls the electronic device to conduct the LTE handover to the other VoLTE area. By contrast, when receiving the handover response signal accepting the handover of the electronic device only from the legacy BS, the handover controller 310 controls the electronic device to conduct the SRVCC to the legacy BS.

Figure 4:
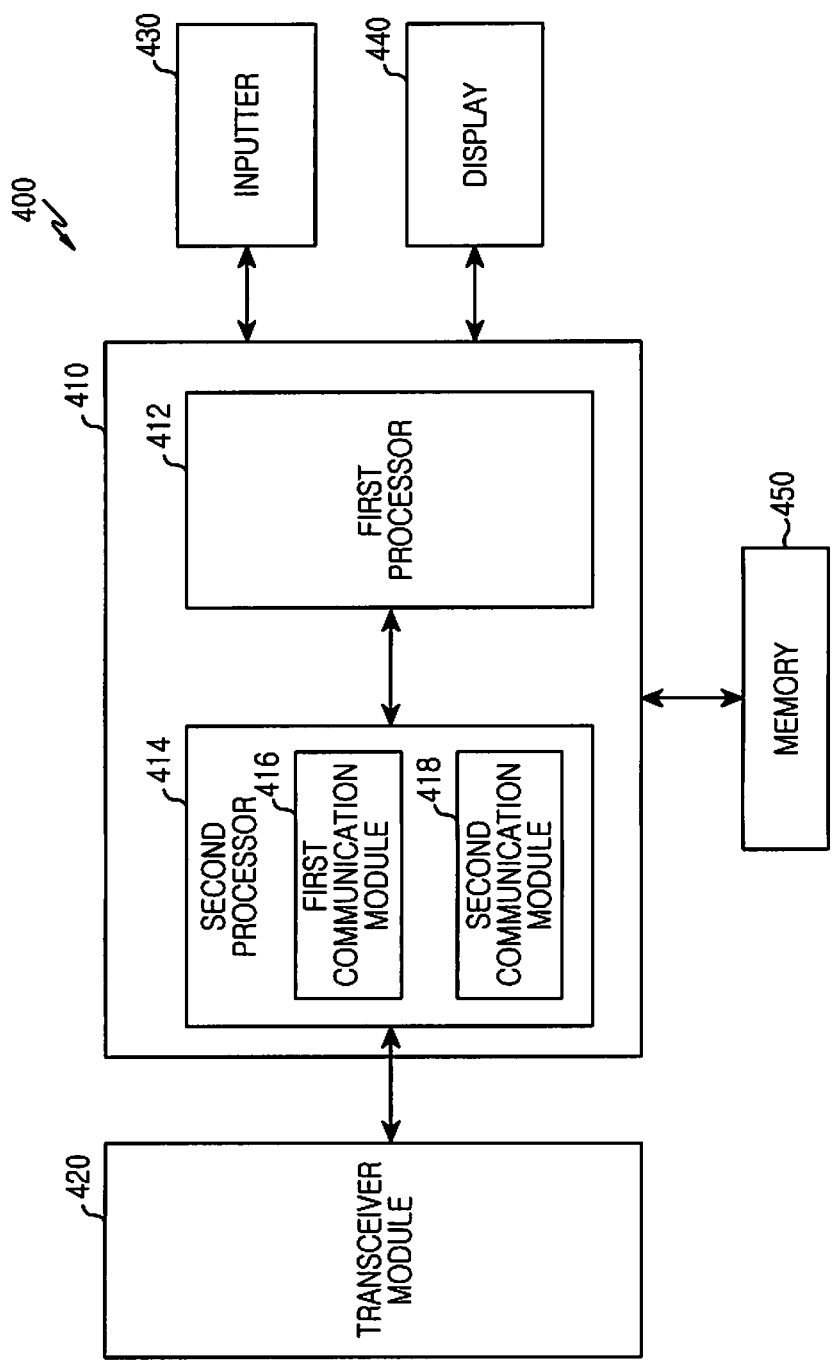
FIG. 4 illustrates a configuration of an electronic device according to an embodiment of the present invention.

FIG. 4 is a block diagram of a configuration of the electronic device according to an embodiment of the present invention.

Referring to FIG. 4, the electronic device 400 includes a processor unit 410, a transceiver module 420, an inputter 430, a display 440, and a memory 450. Herein, the electronic device 400 may include a plurality of memories 450.

The processor unit 410 includes a plurality of processors 412 and 414.

The first processor 412 controls the operations of the electronic device 400. The first processor 412 determines an operation mode of the electronic device 400 based on handover control information received from the BS. For example, in the VoLTE area, the first processor 412 controls the second processor 414 to provide the data and voice services by accessing the LTE network. As another example, when receiving SRVCC triggering information from the BS in the VoLTE service, the first processor 412 controls to hand over to the legacy network. Hence, the first processor 412 controls the second processor 414 to conduct the communication by accessing the legacy network. As another example, when receiving LTE handover triggering information from the BS in the VoLTE service, the first processor 412 controls to hand over to the other VoLTE area. As another example, when the electronic device performs the LTE handover to the target BS during the VoLTE service but Internet Protocol (IP) Multimedia Subsystem (IMS) voice over Packet-Switched (PS) session received from the BS is OFF, the first processor 412 recognizes the non-VoLTE area supporting the LTE handover. Hence, the first processor 412 ends the VoLTE service and then switches to a non-VoLTE mode. Here, the non-VoLTE mode may include one of a Circuit Switched Fallback (CSFB) mode, a dual-stack mode (or dual-standby), and an LTE disable mode.

The second processor 414 controls to provide the communication service of the electronic device 400 using a first communication module 416 and a second communication module 418 which are logically or physically separated. For example, when the electronic device 400 travels in the VoLTE area, the second processor 414 controls to provide the data service and the VoLTE service using either the first communication module 416 or the second communication module 418. When the first processor 412 controls to access the legacy network according to the SRVCC, the second processor 414 controls to provide the data service and the voice communication service by accessing the legacy network using either the first communication module 416 or the second communication module 418. As another example, when the electronic device 400 travels in the non-VoLTE area, the second processor 414 controls to provide the data service and the voice communication service using either the first communication module 416 or the second communication module 418 according to the operation mode of the electronic device 400. Here, the operation mode of the electronic device 400 mode may include one of the CSFB mode, the dual-stack mode, and Simultaneous Voice and LTE (SVLTE). The dual-stack mode is a communication mode for providing the LTE service in a non-CSFB area by activating a data communication module and a voice communication module which share a radio transceiver module in the non-CSFB area. The SVLTE is a communication mode for providing both of the data communication over the LTE network and the voice communication over a CS network using a separate LTE transceiver module and a CS transceiver module of the terminal. The CS network may include one of a Code Division Multiple Access (CDMA) 1X and Global System for Mobile communications (GSM).

The transceiver module 420 transmits and receives signals of the multiple communication networks via one or more antennas. For example, the transceiver module 420 processes the signals transmitted and received over the CS network and the PS network.

The inputter 430 provides input data generated by a user's selection to the first processor 412. For example, the inputter 430 includes one or more of a keypad including at least one hardware button and a touchpad for detecting touch information.

The display 440 displays status information of the electronic device 400, a character input by the user, a still picture, and/or a moving picture. For example, the display 440 displays application information driven by the processor unit 410.

The memory 450 includes a data storage for storing the data generated in the operation of the electronic device 400, and a program storage for storing one or more programs for controlling the electronic device 400.

Figure 5:
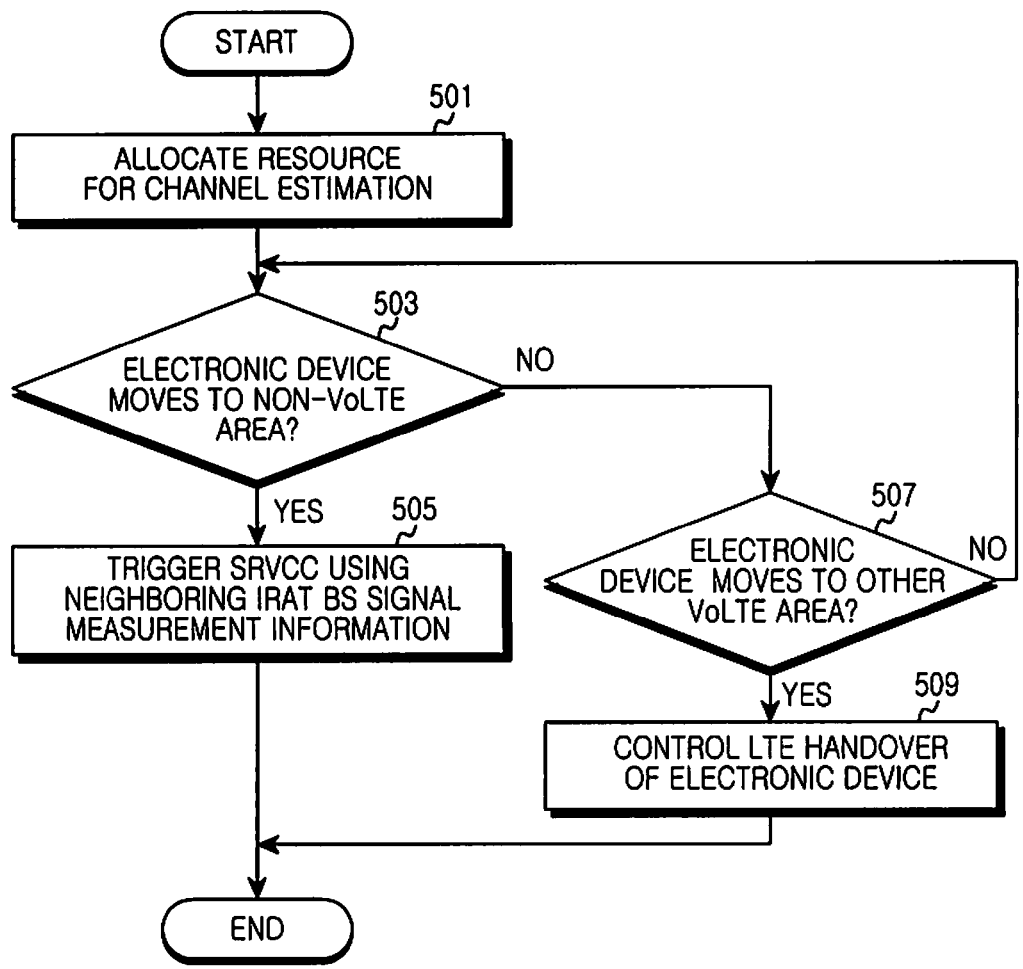
FIG. 5 illustrates a method for triggering SRVCC in the BS when the electronic device moves to a non-VoLTE area according to an embodiment of the present invention.

FIG. 5 illustrates a method for triggering the SRVCC in the BS when the electronic device moves to the non-VoLTE area according to an embodiment of the present invention.

Referring to FIG. 5, the BS (e.g., the BS 200 of FIG. 2) allocates the measurement resource (e.g., the measurement GAP) for the VoLTE electronic devices in the service area to measure the neighboring IRAT BS signal strength for channel estimation in step 501.

In step 503, the BS determines whether the VoLTE electronic device moves to the non-VoLTE area. For example, the VoLTE electronic device transmits the neighboring LTE BS signal measurement information and the neighboring IRAT BS signal measurement information to the BS. Using the neighboring LTE BS signal measurement information received from the electronic device and the neighboring LTE BS VoLTE support information stored in the memory 230 (see FIG. 2) of the BS, the BS determines whether the VoLTE electronic device moves to the non-VoLTE area. That is, the BS determines whether the signal strength from the BS of the VoLTE area to the electronic device decreases and whether the signal strength from the BS of the non-VoLTE area to the electronic device increases.

When the VoLTE electronic device moves to the non-VoLTE area, the BS maintains the voice call service of the electronic device by triggering the SRVCC using the neighboring IRAT BS signal measurement information received from the electronic device in step 505.

When the VoLTE electronic device does not move to the non-VoLTE area in step 503, the BS determines whether the VoLTE electronic device moves to the other VoLTE area in step 507. For example, the BS determines whether the VoLTE electronic device moves to the other VoLTE area, using the neighboring LTE BS signal measurement information received from the electronic device and the neighboring LTE BS VoLTE support information stored in the memory 230 (see FIG. 2) of the BS. That is, the BS determines whether the signal strength from the current LTE BS to the electronic device decreases and whether the signal strength from the other BS of the VoLTE area to the electronic device increases.

When the VoLTE electronic device does not move to the other VoLTE area, the BS continuously determines whether the VoLTE electronic device moves to the other VoLTE area. For example, the BS determines whether the VoLTE electronic device moves to the non-VoLTE area in step 503.

When the VoLTE electronic device moves to the other VoLTE area in step 507, the BS triggers the LTE handover of the electronic device in step 509. That is, the BS controls to continue the VoLTE service of the electronic device such that the VoLTE electronic device performs the LTE handover to the other LTE area.

Figure 6:
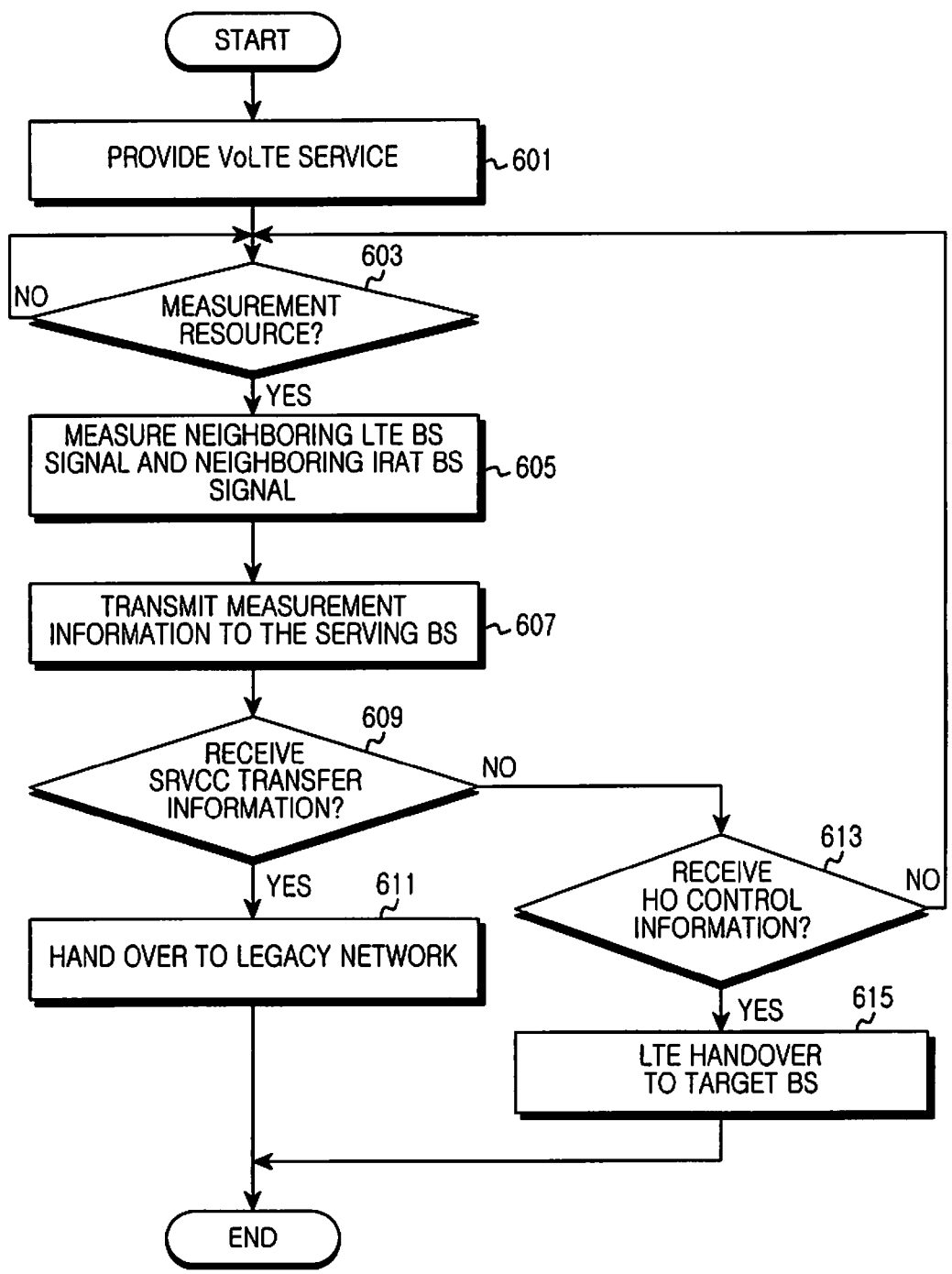
FIG. 6 illustrates a handover method of the electronic device according to an embodiment of the present invention.

FIG. 6 illustrates a handover method of the electronic device according to an embodiment of the present invention.

Referring to FIG. 6, the electronic device (e.g., the electronic device 400 of FIG. 4) provides the VoLTE service via the BS of the VoLTE area in step 601.

In the VoLTE service, the electronic device determines whether the measurement resource for measuring the neighboring IRAT BS signal strength is allocated in step 603. For example, the electronic device determines whether the serving BS allocates the measurement resource for the VoLTE electronic devices to measure the neighboring IRAT BS signal strength.

When the measurement resource is allocated, the electronic device measures the neighboring LTE BS signal strength and the neighboring IRAT BS signal strength in step 605. For example, the electronic device periodically measures the neighboring IRAT BS signal or the neighboring LTE BS signal of a different frequency from the serving LTE BS, using the measurement resource allocated to measure the neighboring IRAT BS signal strength. As another example, the electronic device measures the signals of the serving LTE BS and the neighboring LTE BS signal of the same frequency as the serving LTE BS, using resource other than the measurement resource allocated to measure the neighboring IRAT BS signal strength.

In step 607, the electronic device transmits the neighboring LTE BS signal measurement information and the neighboring IRAT BS signal measurement information to the serving BS.

In step 609, the electronic device determines whether SRVCC transfer information is received from the serving BS.

Upon receiving the SRVCC transfer information from the serving BS, the electronic device hands over to the legacy network according to the SRVCC in step 611.

When the SRVCC transfer information from the serving BS is not received in step 609, the electronic device determines whether HandOver (HO) control information is received from the serving BS in step 613.

Upon receiving the HO control information from the serving BS, the electronic device performs the LTE handover to the target BS of the VoLTE area in step 615.

When the HO control information from the serving BS is not received in step 613, the electronic device transmits the neighboring LTE BS signal measurement information and the neighboring IRAT BS signal measurement information to the serving BS. Thus, the electronic device can confirm the measurement resource allocated to measure the neighboring IRAT BS signal strength in step 603.

Figure 7:
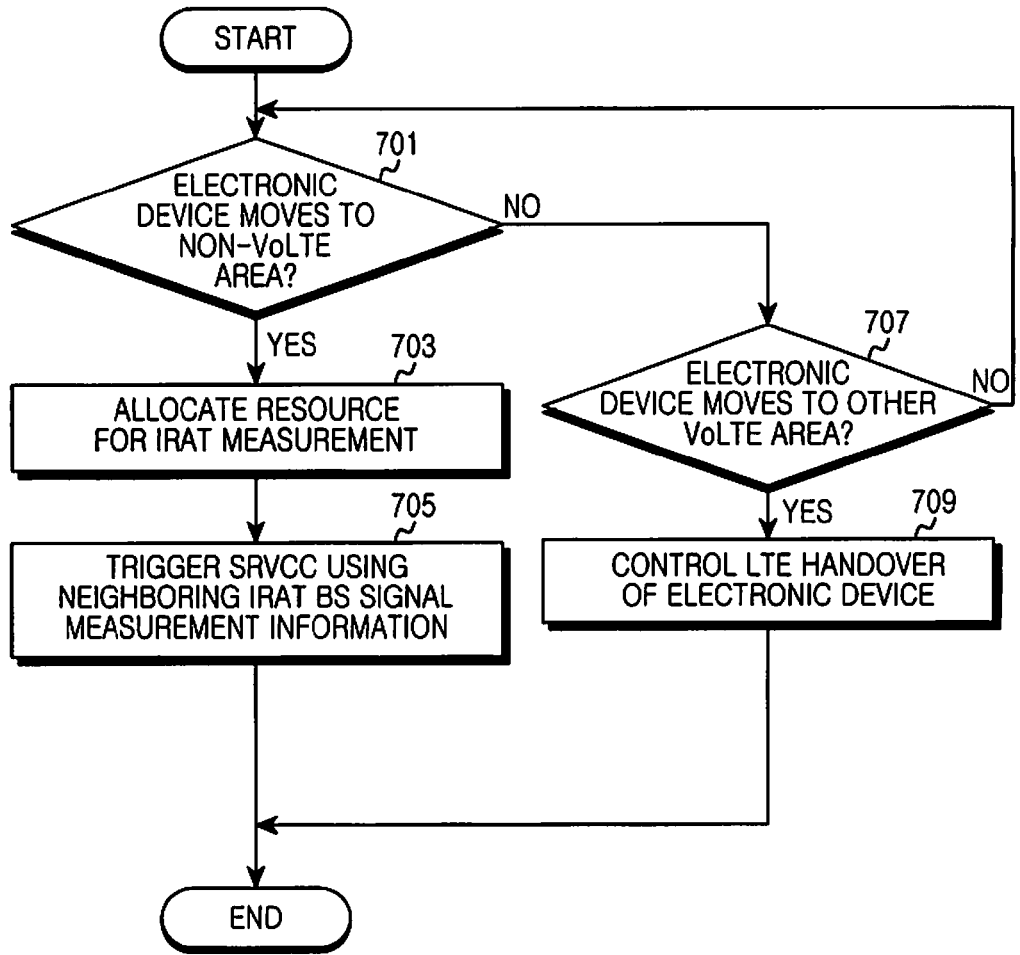
FIG. 7 illustrates a method for triggering the SRVCC in the BS when the electronic device moves to the non-VoLTE area according to another embodiment of the present invention.

FIG. 7 illustrates a method for triggering the SRVCC in the BS when the electronic device moves to the non-VoLTE area according to another embodiment of the present invention.

Referring to FIG. 7, the BS (e.g., the BS 200 of FIG. 2) determines whether the electronic device which uses the VoLTE service via the BS moves to the non-VoLTE area via the BS in step 701. For example, using the neighboring LTE BS signal measurement information received from the electronic device and the neighboring LTE BS VoLTE support information stored in the memory 230 (see FIG. 2) of the BS, the BS can determine whether the VoLTE electronic device moves to the non-VoLTE area. That is, the BS determines whether the signal strength from the BS of the non-VoLTE area to the electronic device increases.

When the VoLTE electronic device moves to the non-VoLTE area, the BS allocates the measurement resource for the electronic device to measure the neighboring IRAT BS signal strength in step 703.

In step 705, the BS triggers the SRVCC using the neighboring IRAT BS signal measurement information received from the electronic device. For example, the electronic device measures the neighboring IRAT BS signal strength, using the measurement resource allocated to measure the neighboring IRAT BS signal strength. When the signal strength between the BS of the non-VoLTE and the electronic device area increases, the BS triggers the SRVCC for the electronic device.

When the VoLTE electronic device does not move to the non-VoLTE area in step 701, the BS determines whether the VoLTE electronic device moves to the other VoLTE area in step 707. For example, the BS determines whether the VoLTE electronic device moves to the other VoLTE area, using the neighboring LTE BS signal measurement information received from the electronic device and the neighboring LTE BS VoLTE support information stored in the memory 230 (see FIG. 2) of the BS. That is, the BS determines whether the signal strength from the current LTE BS to the electronic device decreases and whether the signal strength from the other BS of the VoLTE area to the electronic device increases.

When the VoLTE electronic device does not move to the other VoLTE area, the BS continuously determines whether the VoLTE electronic device moves to the other VoLTE area. For example, the BS determines whether the VoLTE electronic device moves to the non-VoLTE area in step 701.

When the VoLTE electronic device moves to the other VoLTE area in step 707, the BS triggers the LTE handover of the electronic device in step 709. For example, the electronic device measures the neighboring IRAT BS signal strength, using the measurement resource allocated to measure the neighboring IRAT BS signal strength. When the signal strength between the BS of the other VoLTE and the electronic device area increases, the BS triggers the LTE handover of the electronic device to the corresponding BS. That is, the BS controls the VoLTE electronic device to perform the LTE handover to the other LTE area.

Figure 8:
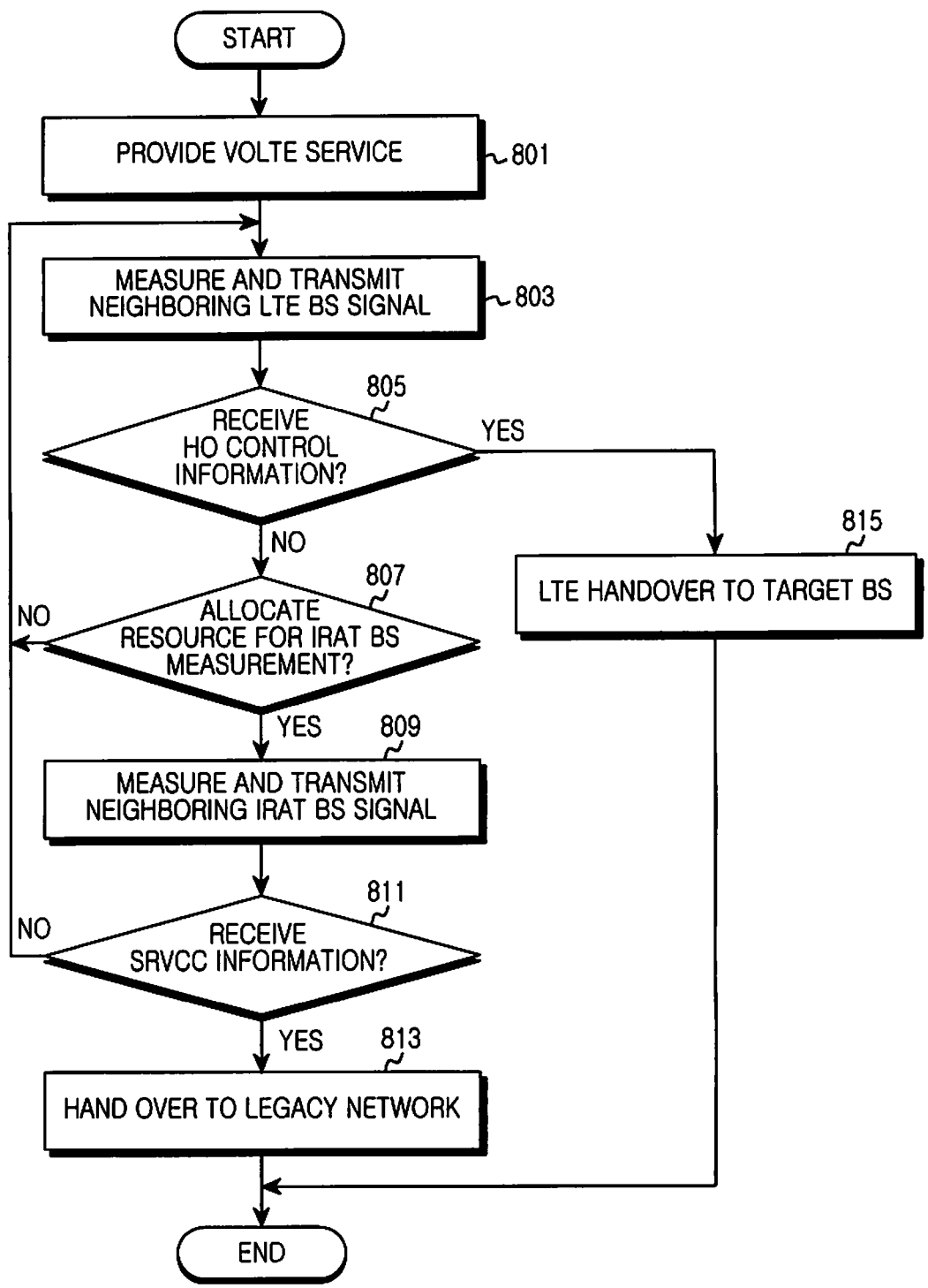
FIG. 8 illustrates a handover method of the electronic device according to another embodiment of the present invention.

FIG. 8 illustrates a handover method of the electronic device according to another embodiment of the present invention.

Referring to FIG. 8, the electronic device (e.g., the electronic device 400 of FIG. 4) provides the VoLTE service via the BS of the VoLTE area in step 801.

During the VoLTE service, the electronic device measures and transmits the neighboring LTE BS signal strength to the serving BS in step 803. For example, the electronic device periodically estimates and transmits an LTE channel information of the neighboring LTE area to the serving BS.

In step 805, the electronic device determines whether the HO control information is received from the serving BS.

Upon receiving the HO control information from the serving BS, the electronic device performs the LTE handover to the target BS of the VoLTE area in step 815.

When the HO control information is not received in step 805, the electronic device determines whether the serving BS allocates the measurement resource for measuring the neighboring IRAT BS signal strength in step 807.

When the measurement resource is allocated in step 807, the electronic device measures the neighboring IRAT BS signal strength using the measurement resource and transmits the measured neighboring 1RAT BS signal strength to the serving BS in step 809. For example, the electronic device periodically measures the neighboring IRAT BS signal strength using the measurement resource allocated to measure the neighboring IRAT BS signal strength. When the measurement resource is not allocated in step 807, the electronic device proceeds to step 803.

In step 811, the electronic device determines whether the SRVCC transfer information is received from the serving BS. Upon receiving the SRVCC transfer information from the serving BS, the electronic device hands over to the legacy network according to the SRVCC control information received from the serving BS in step 813. For example, the serving BS selects the LTE handover or the SRVCC using the neighboring IRAT BS signal measurement information received from the electronic device and the neighboring LTE BS signal measurement information. When the serving BS selects the SRVCC for the electronic device, the electronic device hands over to the legacy network according to the SRVCC control information received from the serving BS. Although it is not illustrated, when the serving BS selects the LTE handover of the electronic device, the electronic device performs the LTE handover to the target BS of the VoLTE area.

As described above, the BS determines whether the VoLTE electronic device moves to the non-VoLTE area or the other VoLTE area, based on the neighboring BS VoLTE support information stored in the memory 230 (see FIG. 2) of the BS.

Figure 9:
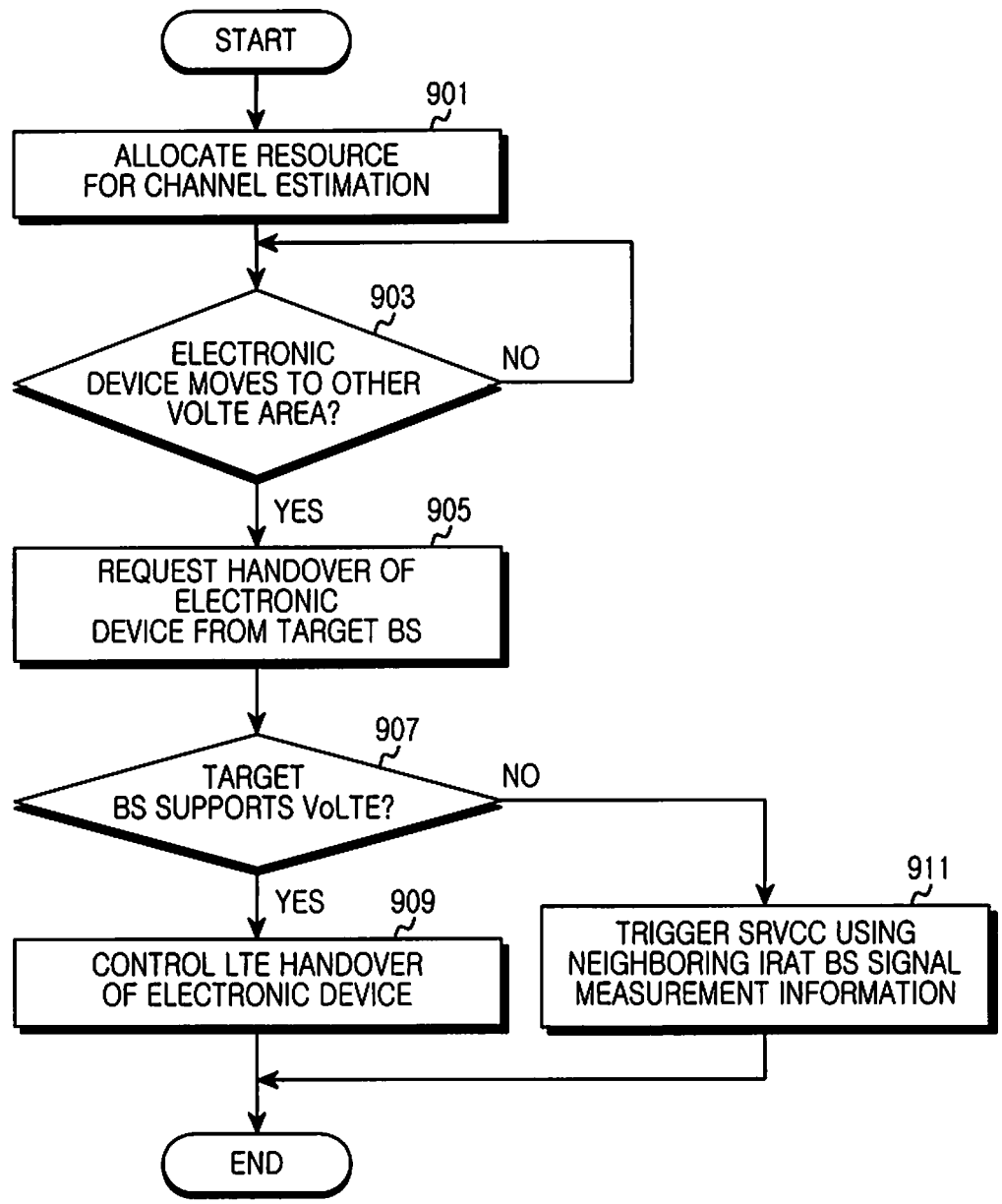
FIG. 9 illustrates a method for controlling the handover of the electronic device in the BS according to an embodiment of the present invention.
Figure 10:
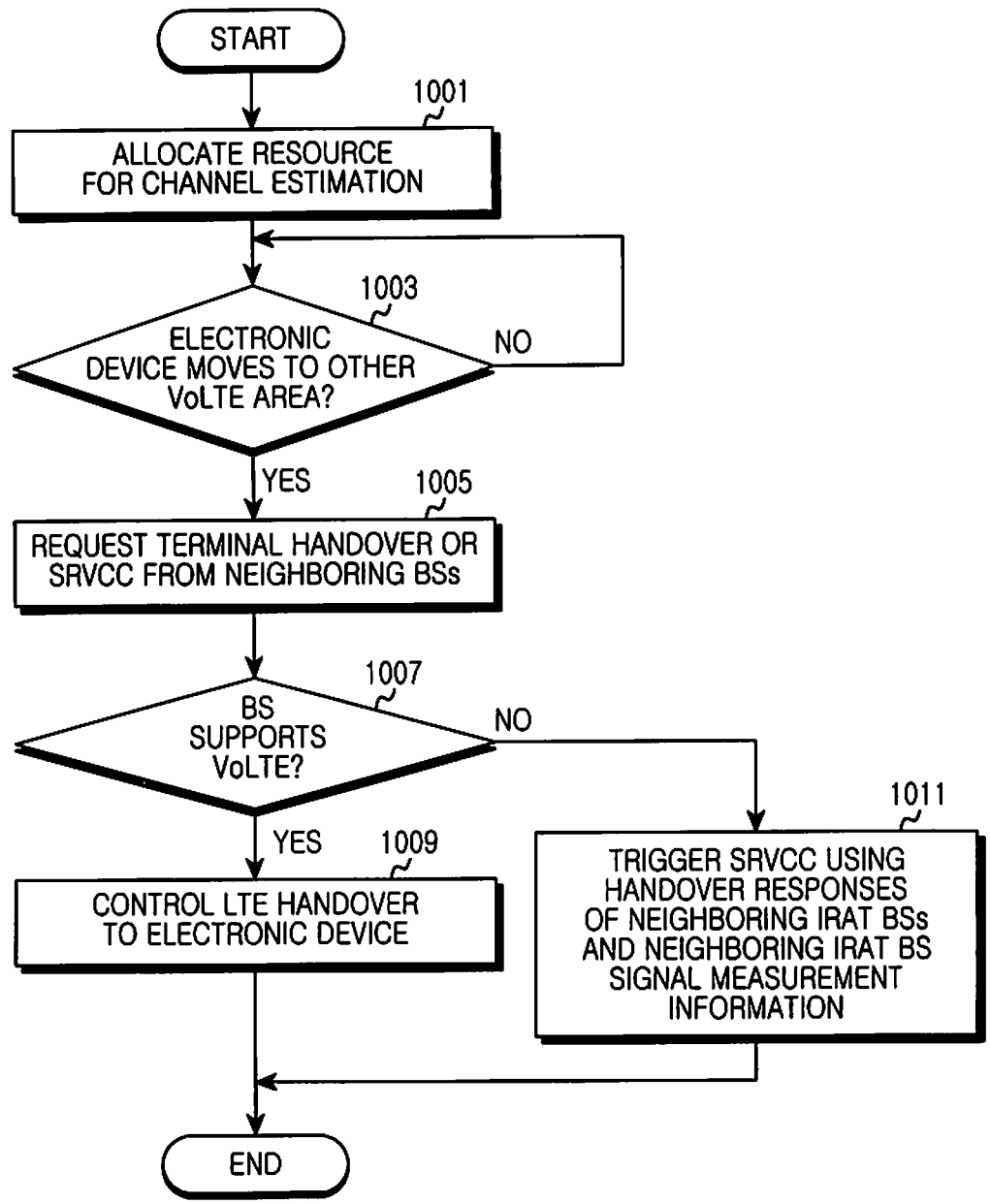
FIG. 10 illustrates a method for controlling the handover of the electronic device in the BS according to another embodiment of the present invention.
Figure 11:
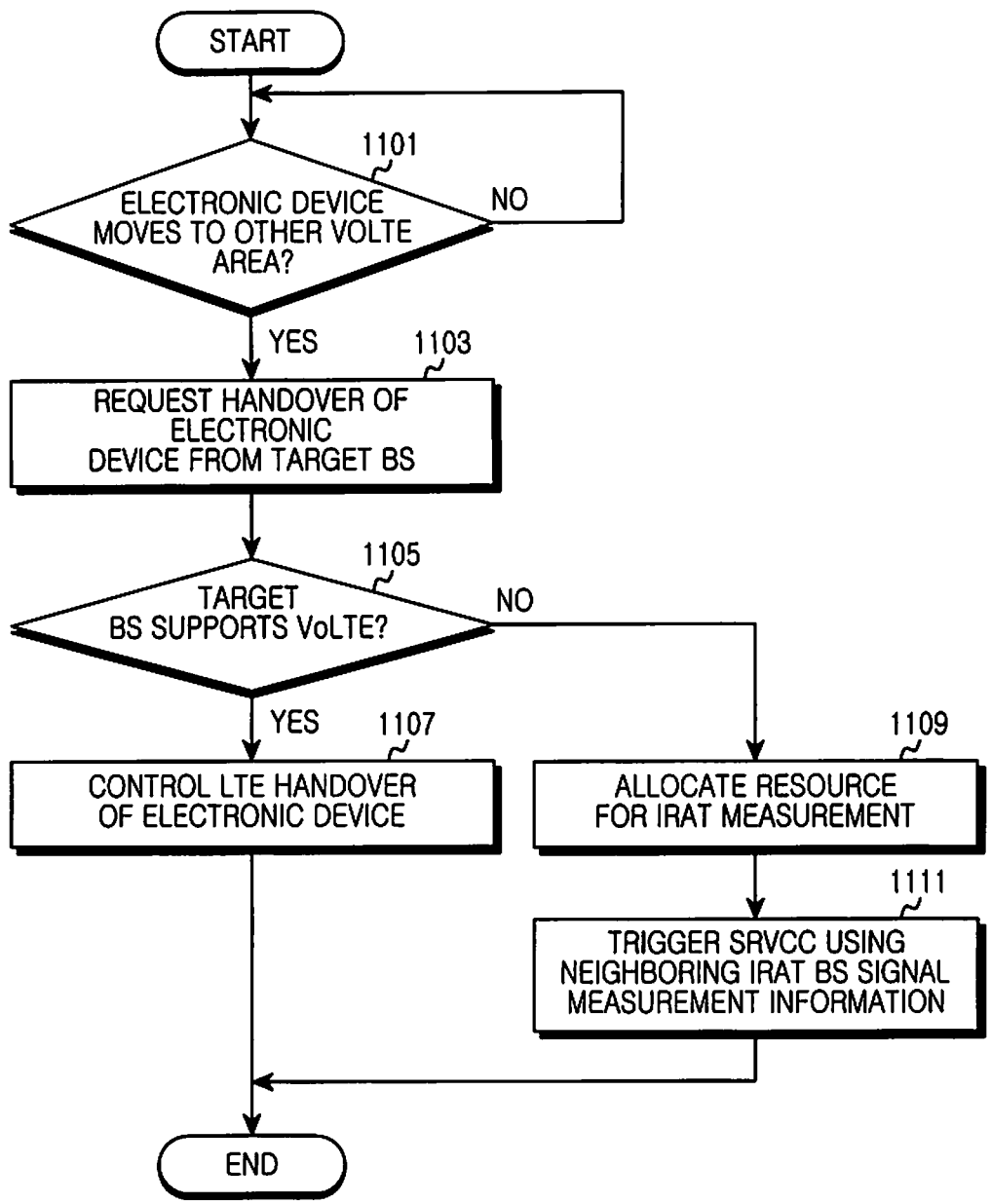
FIG. 11 illustrates a method for controlling the handover of the electronic device in the BS according to another embodiment of the present invention.

Alternatively, the BS determines whether the target BS supports the VoLTE in the process of the handover preparation as shown in FIGS. 9, 10, and 11.

FIG. 9 illustrates a method for controlling the handover of the electronic device in the BS according to an embodiment of the present invention.

Referring to FIG. 9, the based station (e.g., the BS 200 of FIG. 2) allocates the measurement resource for the VoLTE electronic devices traveling in the service area to measure the neighboring IRAT BS signal strength for channel estimation in step 901.

In step 903, the BS repeatedly determines whether the VoLTE electronic device moves to the other VoLTE area. For example, the VoLTE electronic device transmits the neighboring LTE BS signal measurement information and the neighboring IRAT BS signal measurement information to the BS. The BS determines whether the VoLTE electronic device moves to the other VoLTE area, using the neighboring LTE BS signal measurement information received from the electronic device. That is, the BS determines whether the signal strength from the current LTE BS to the electronic device decreases and whether the signal strength from the other BS of the VoLTE area to the electronic device increases.

When the VoLTE electronic device moves to the other VoLTE area, the BS transmits a handover request signal of the electronic device to the target BS of the other LTE area in step 905.

Based on a handover response signal from the target BS, the BS determines whether the target BS supports the VoLTE service in step 907. For example, when requesting the handover of the electronic device, the BS generates and transmits a bearer list including the supported LTE service information to the target BS. The target BS recognizes a bearer of the VoLTE service in the bearer list by considering the VoLTE characteristics such as Quality of Service (QoS) level and User Datagram Protocol (UDP). When not supporting the VoLTE service, the target BS transmits the regenerated bearer list not supporting VoLTE service to the BS via the handover response signal. Hence, the BS determines whether the target BS supports the VoLTE service, based on the bearer list of the handover response signal from the target BS. For example, a Mobility Management Entity (MME) of the target BS deletes the unsupported service from the bearer list received from the BS. Thus, the BS determines whether the target BS supports the VoLTE service, based on the bearer list of the handover response signal received from the MME of the target BS.

When the target BS supports the VoLTE service in step 907, the BS triggers the LTE handover of the electronic device in step 909. That is, the BS controls the VoLTE electronic device to perform the LTE handover to the other LTE area.

When the target BS does not support the VoLTE service in step 907, the BS triggers the SRVCC using the neighboring IRAT BS signal measurement information received from the electronic device in step 911.

FIG. 10 illustrates a method for controlling the handover of the electronic device in the BS according to another embodiment of the present invention.

Referring to FIG. 10, the based station (e.g., the BS 200 of FIG. 2) allocates the measurement resource for the VoLTE electronic devices traveling in the service area to measure the neighboring IRAT BS signal strength for channel estimation in step 1001.

In step 1003, the BS repeatedly determines whether the VoLTE electronic device moves to the other VoLTE area. For example, the VoLTE electronic device transmits the neighboring IRAT BS signal measurement information and the neighboring LTE BS signal measurement information to the BS. In such a way, the BS determines whether the VoLTE electronic device moves to the other VoLTE area, using the neighboring LTE BS signal measurement information received from the electronic device. That is, the BS determines whether the signal strength from the current LTE BS to the electronic device decreases and whether the signal strength from the other BS of the VoLTE area to the electronic device increases.

When the VoLTE electronic device moves to the other VoLTE area, the BS transmits the handover request signal of the electronic device to one or more neighboring BSs having the received signal strength of the electronic device exceeding the reference value in step 1005. For example, the BS selects the neighboring LTE BS to request the handover of the electronic device using the neighboring LTE BS signal measurement information received from the electronic device, and selects the legacy BS to request the handover of the electronic device using the neighboring IRAT BS signal measurement information received from the electronic device.

In step 1007, the BS determines whether the handover response signal is received from the neighboring BS supporting the VoLTE service. For example, the BS identifies the neighboring BS supporting the handover of the electronic device and the VoLTE service, based on the handover response signal received from one or more neighboring BSs.

Upon receiving the handover response signal from the neighboring BS supporting the VoLTE service, the BS control the VoLTE electronic device to perform the LTE handover to the other VoLTE area in step 1009. For example, when receiving the handover response signal from a plurality of neighboring BSs supporting the VoLTE service, the BS determines the neighboring BS having the greatest signal strength to the electronic device, as the target BS. Hence, the BS controls the VoLTE electronic device to perform the LTE handover to the target BS.

When receiving the handover response signal from the neighboring BS not supporting the VoLTE service or receiving a response signal indicating no VoLTE support from every neighboring LTE BS in step 1007, the BS triggers the SRVCC using the handover response signals of the neighboring IRAT BSs and the neighboring IRAT BS signal measurement information received from the electronic device in step 1011. For example, when receiving the handover response signals of the neighboring IRAT BSs, the BS determines one of the neighboring IRAT BSs of the received handover response signals as the target IRAT BS and thus controls the electronic device to hand over to the corresponding IRAT BS. In such a way, the BS determines the neighboring IRAT BS having the greatest received signal strength to the electronic device, as the target IRAT BS.

FIG. 11 illustrates a method for controlling the handover of the electronic device in the BS according to another embodiment of the present invention.

Referring to FIG. 11, the BS determines whether the VoLTE electronic device moves to the other VoLTE area in step 1101. For example, the BS determines whether the VoLTE electronic device moves to the other VoLTE area, using the neighboring LTE BS signal measurement information received from the electronic device. That is, the BS determines whether the signal strength from the current LTE BS to the electronic device decreases and whether the signal strength from the other BS of the VoLTE area to the electronic device increases.

When the VoLTE electronic device moves to the other VoLTE area, the BS transmits the handover request signal of the electronic device to the target BS of the other LTE area in step 1103.

Based on the handover response signal from the target BS, the BS determines whether the target BS supports the VoLTE service in step 1105. For example, when requesting the handover of the electronic device, the BS generates and transmits the bearer list including the supported LTE service information to the target BS. The target BS recognizes the bearer of the VoLTE service in the bearer list by considering the VoLTE characteristics such as QoS level and UDP. When not supporting the VoLTE service, the target BS transmits the regenerated bearer list not supporting VoLTE service to the BS via the handover response signal. Hence, the BS determines whether the target BS supports the VoLTE service, based on the bearer list of the handover response signal from the target BS. For example, the MME of the target BS deletes the unsupported service from the bearer list received from the BS. Thus, the BS determines whether the target BS supports the VoLTE service, based on the bearer list of the handover response signal received from the MME of the target BS.

When the target BS supports the VoLTE service in step 1105, the BS triggers the LTE handover of the electronic device in step 1107. That is, the BS controls the VoLTE electronic device to perform the LTE handover to the other LTE area.

When the target BS does not support the VoLTE service in step 1105, the BS allocates the measurement resource for measuring the neighboring IRAT BS signal of the electronic device in step 1109.

In step 1111, the BS triggers the SRVCC using the neighboring IRAT BS signal measurement information received from the electronic device. For example, when the signal strength from the BS of the non-VoLTE area to the electronic device increases, the BS triggers the SRVCC of the electronic device. Although it is not illustrated here, when the signal strength from the BS of the other VoLTE area to the electronic device increases, the BS may trigger the SRVCC of the electronic device.

As described above, the non-VoLTE area cannot support the VoLTE service.

Alternatively, the non-VoLTE area does not support the VoLTE service but can support the LTE handover of the VoLTE electronic device. For example, while a first LTE area can support the VoLTE service through IMS PDN, the support of the VoLTE service can be limited when an LTE service provider limits the VoLTE capability or the VoLTE service stability is deteriorated. In such a case, the first LTE area can support the LTE handover of the electronic device in order to prevent the interrupted voice communication service of the VoLTE electronic device. The BS of the first LTE area can, in response to the access or Tracking Area Update (TAU) to notify the non-VoLTE area, transmit IMS voice over PS session indication information which is set to OFF, to the electronic device. When receiving the VoLTE handover request of the VoLTE electronic device from the neighboring LTE BS to support the VoLTE handover, the BS of the first LTE area can hand the electronic device over by allocating the resource for the VoLTE handover and then support the VoLTE service. When the VoLTE service of the electronic device ends, the first LTE area can serve as the non-VoLTE area.

Figure 12:
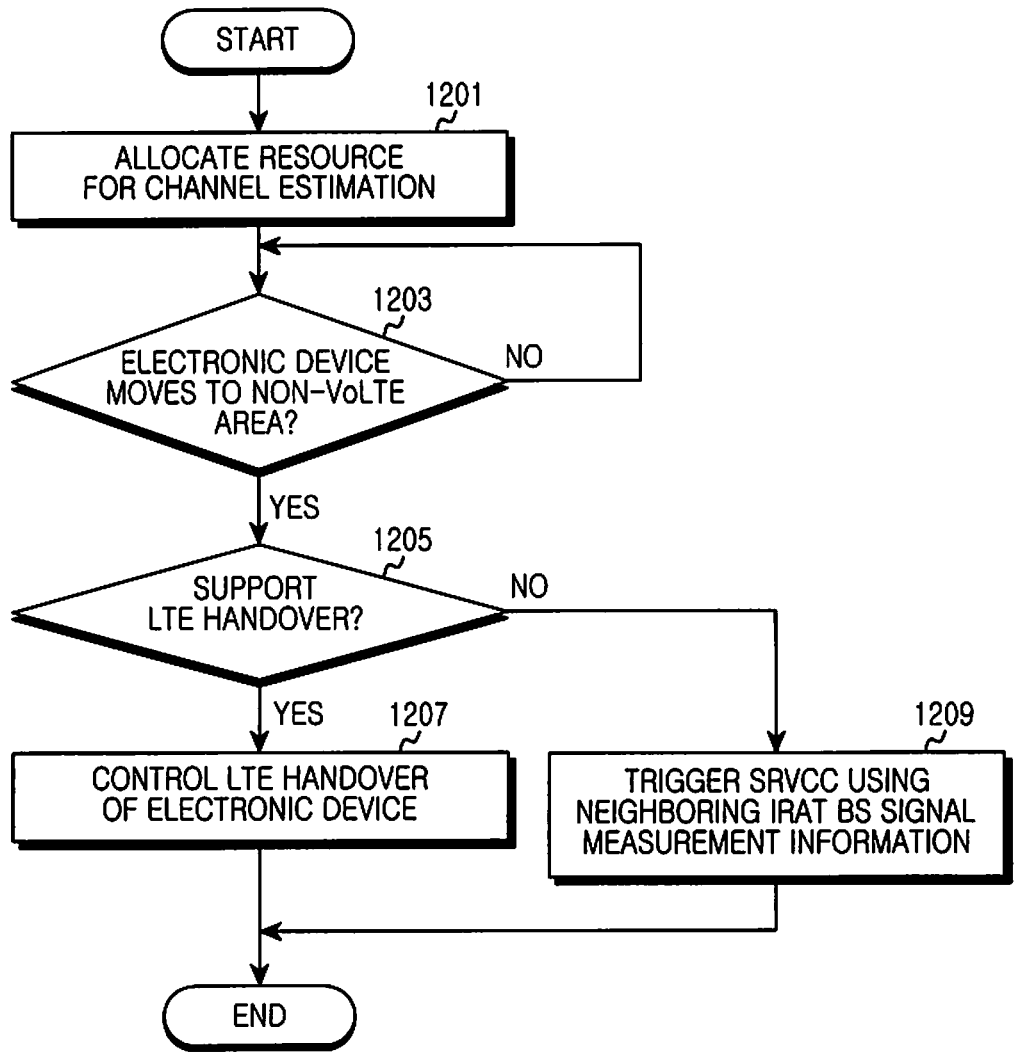
FIG. 12 illustrates a method for controlling LTE handover of the electronic device in the BS according to an embodiment of the present invention.

When the wireless communication system places the LTE handover above the SRVCC of the VoLTE electronic device, the BS can operate as shown in FIG. 12.

FIG. 12 illustrates a method for controlling LTE handover of the electronic device in the BS according to an embodiment of the present invention.

Referring to FIG. 12, the based station (e.g., the BS 200 of FIG. 2) allocates the measurement resource for the VoLTE electronic devices traveling in the service area to measure the neighboring IRAT BS signal strength for channel estimation in step 1201.

In step 1203, the BS repeatedly determines whether the VoLTE electronic device moves to the non-VoLTE area. For example, the VoLTE electronic device transmits the neighboring LTE BS signal measurement information and IRAT measurement information measured using the IRAT resource, to the BS. Using the neighboring LTE BS signal measurement information received from the electronic device and the neighboring LTE BS VoLTE support information stored in the memory 230 (see FIG. 2) of the BS, the BS determines whether the VoLTE electronic device moves to the non-VoLTE area. That is, the BS determines whether the signal strength from the BS of the non-VoLTE area to the electronic device increases.

When the VoLTE electronic device moves to the non-VoLTE area, the BS determines whether the non-VoLTE area supports the LTE handover in step 1205. For example, the BS determines whether the BS of the non-VoLTE area supports the LTE handover for the VoLTE service, using the neighboring LTE BS VoLTE support information stored in the memory 230 (see FIG. 2) of the BS.

When the BS of the non-VoLTE area supports the LTE handover for the VoLTE service, the BS controls the VoLTE electronic device to perform the LTE handover to the BS of the non-LTE area in step 1207.

When the BS of the non-VoLTE area does not support the LTE handover in step 1205, the BS triggers the SRVCC to the legacy BS using the neighboring IRAT BS signal measurement information received from the electronic device in step 1209.

As described above, when the VoLTE electronic device performs the LTE handover of the VoLTE service to the non-VoLTE area, the electronic device performs the TAU to the BS of the non-VoLTE area. In such a way, the BS transmits the IMS voice over PS session indication information which is set to OFF, to the electronic device in response to the TAU.

Figure 13:
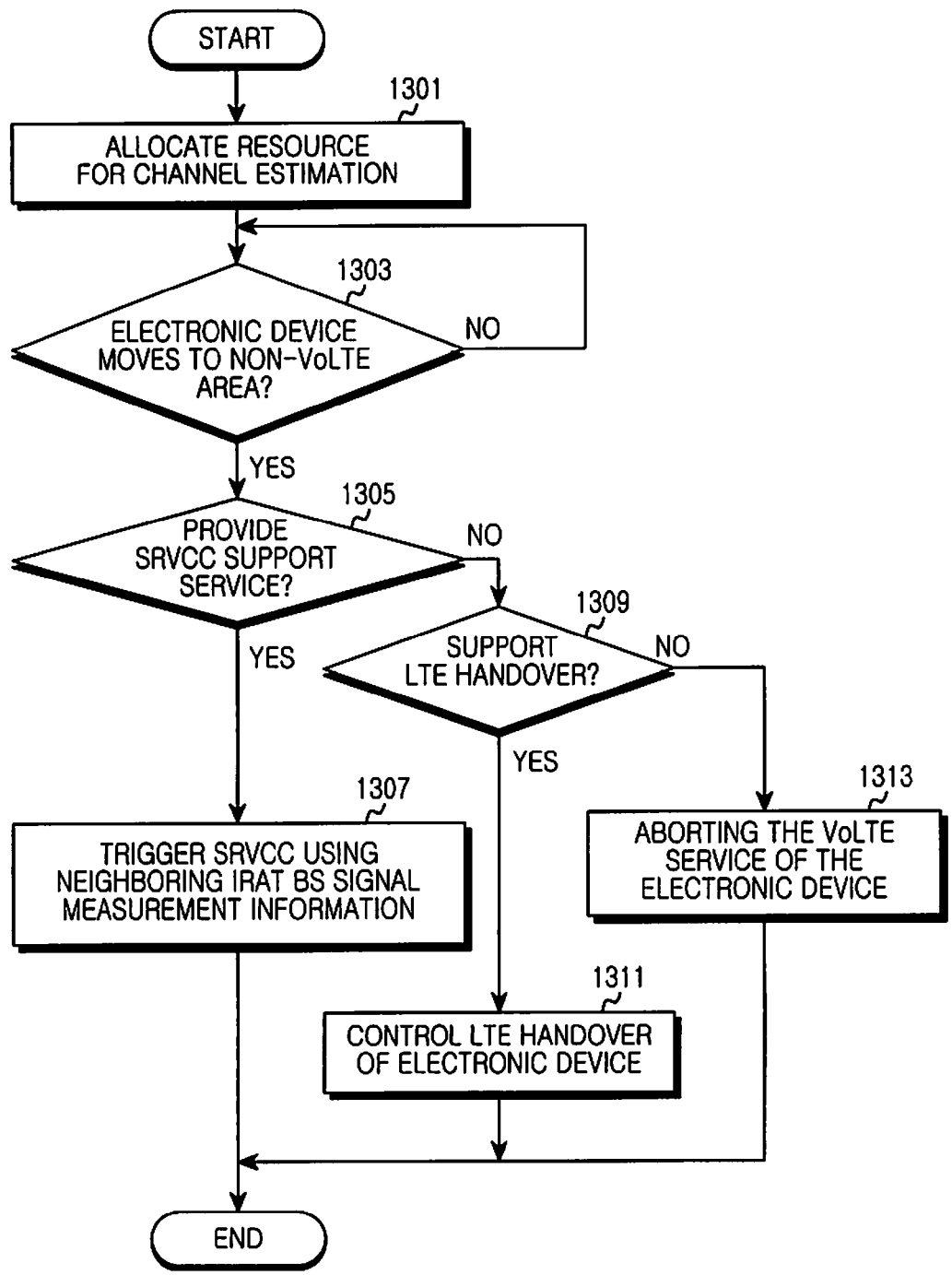
FIG. 13 illustrates a method for controlling the LTE handover of the electronic device in the BS according to another embodiment of the present invention.

FIG. 13 illustrates a method for controlling the LTE handover of the electronic device in the BS according to another embodiment of the present invention.

Referring to FIG. 13, the based station (e.g., the BS 200 of FIG. 2) allocates the measurement resource for the VoLTE electronic devices traveling in the service area to measure the neighboring IRAT BS signal strength for channel estimation in step 1301.

In step 1303, the BS repeatedly determines whether the VoLTE electronic device moves to the non-VoLTE area. For example, the VoLTE electronic device transmits the neighboring LTE BS signal measurement information and the neighboring IRAT BS signal measurement information measured using the measurement resource, to the BS. Using the neighboring LTE BS signal measurement information received from the electronic device and the neighboring LTE BS VoLTE support information stored in the memory 230 (see FIG. 2) of the BS, the BS determines whether the VoLTE electronic device moves to the non-VoLTE area. That is, the BS determines whether the signal strength from the BS of the non-VoLTE area to the electronic device increases.

When the VoLTE electronic device moves to the non-VoLTE area, the BS determines whether the SRVCC of the electronic device is supported based on the characteristics and the status of the VoLTE service in step 1305. For example, the BS determines whether the serving LTE BS and the target legacy BS support the SRVCC based on the characteristics and the status of the VoLTE service of the electronic device. Here, the SRVCC supports one or more of a voice call, a video call, a mid-call, and an alerting mode.

When the SRVCC of the corresponding electronic device is supported based on the characteristics and the status of the VoLTE service in step 1305, the BS triggers the SRVCC to the non-VoLTE area using the neighboring IRAT BS signal measurement information received from the electronic device in step 1307. For example, when the SRVCC of the electronic device is supported based on the characteristics of the VoLTE service, the BS transmits the handover request signal of the electronic device to the legacy BS of the non-VoLTE area. When the legacy BS accepts the handover request of the electronic device, the BS triggers the SRVCC to the legacy area. Although not depicted here, when the legacy BS does not accept the handover request of the electronic device, the BS determines whether the non-VoLTE area supports the LTE handover.

When the SRVCC of the electronic device is not supported based on the characteristics of the VoLTE service in step 1305, the BS determines whether the non-VoLTE area supports the LTE handover in step 1309. For example, the BS determines whether the BS of the non-VoLTE area supports the LTE handover for the VoLTE service, using the neighboring LTE BS VoLTE support information stored in the memory 230 (see FIG. 2) of the BS.

When the BS of the non-VoLTE area does not support the LTE handover in step 1309, the BS aborts the VoLTE service of the VoLTE electronic device in the step 1313.

When the BS of the non-VoLTE area supports the LTE handover in step 1309, the BS controls the electronic device to perform the LTE handover to the BS of the non-LTE area in step 1311.

Figure 14:
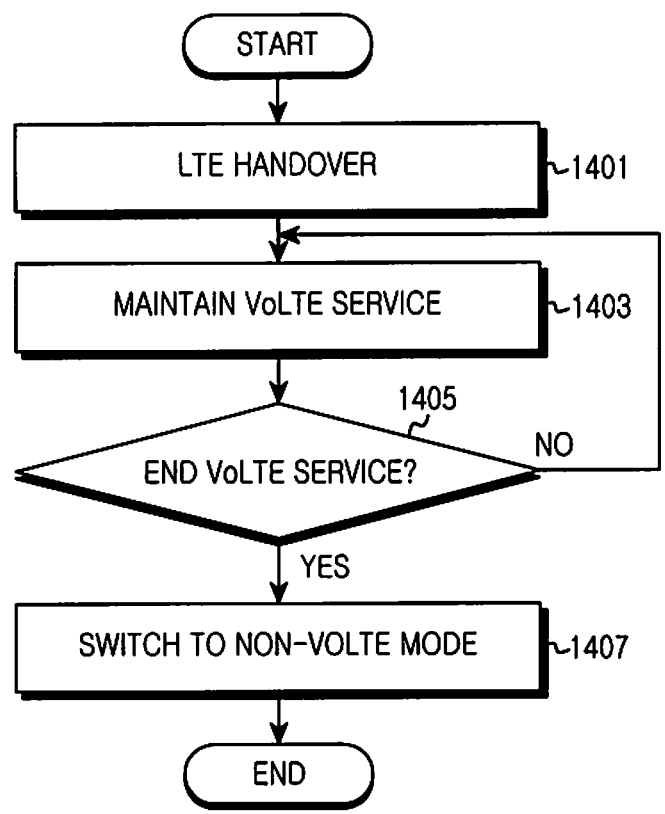
FIG. 14 illustrates a method for maintaining a VoLTE service in the electronic device according to an embodiment of the present invention.

FIG. 14 illustrates a method for maintaining the VoLTE service in the electronic device according to an embodiment of the present invention.

Referring to FIG. 14, the VoLTE electronic device (e.g., the electronic device 400 of FIG. 4) performs the LTE handover to the target BS under the control of the serving BS in step 1401.

In step 1403, the electronic device maintains the VoLTE service. During the VoLTE service, the electronic device provides the VoLTE service for a new incoming voice call or a new outgoing voice call via the target BS. In step 1405, the electronic device determines whether its VoLTE service ends. For example, the electronic device determines whether every VoLTE service via the target BS ends. Here, the VoLTE service may include any voice call such as a holding voice call and a conference call.

When the VoLTE service of the electronic device does not end in step 1405, the electronic device maintains the VoLTE service in step 1403.

When the VoLTE service of the electronic device ends in step 1405, the electronic device switches to the non-VoLTE mode in step 1407. For example, in the LTE handover of step 1401, the electronic device performs the TAU to the BS. In such a way, the BS sets and transmits to the electronic device the IMS voice over PS session indication information, being the TAU response, of ON for the VoLTE service and the IMS voice over PS session indication information of OFF for the limited VoLTE service. Accordingly, when the LTE handover is conducted in the VoLTE service but the IMS voice over PS session indication information received from the BS is set to OFF, the electronic device ends the VoLTE service by recognizing the entrance to the non-VoLTE area supporting the LTE handover, and then switches to the non-VoLTE mode. Here, the non-VoLTE mode may include the CSFB mode, the dual-stack mode, and the LTE disable mode.

Figure 15:
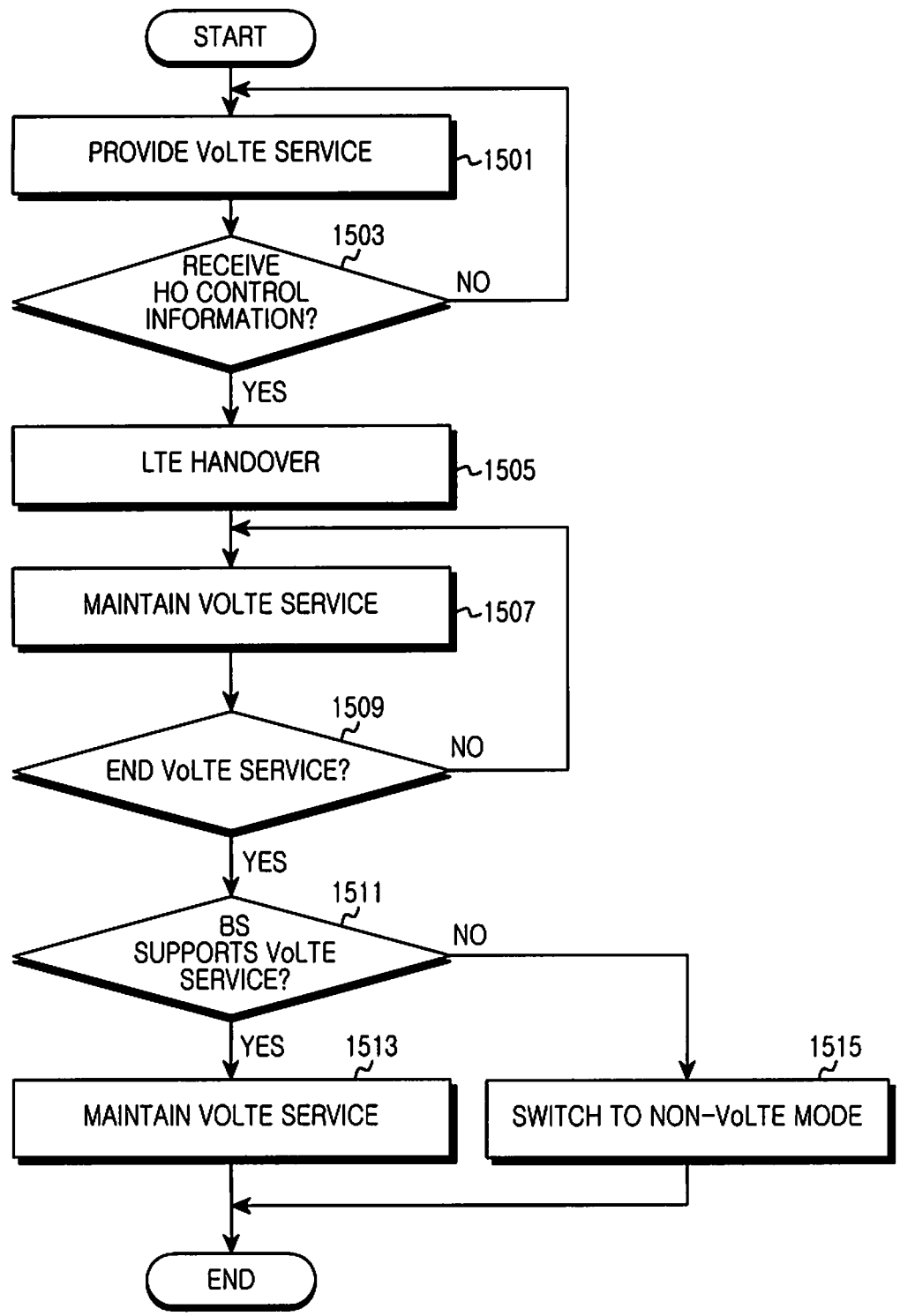
FIG. 15 illustrates a method for maintaining the VoLTE service in the electronic device according to another embodiment of the present invention.

FIG. 15 illustrates a method for maintaining the VoLTE service in the electronic device according to another embodiment of the present invention.

Referring to FIG. 15, the electronic device (e.g., the electronic device 400 of FIG. 4) provides the VoLTE service via the serving BS of the VoLTE area in step 1501.

In step 1503, the electronic device determines whether the HO control information is received from the serving BS.

Upon receiving the HO control information from the serving BS, the electronic device performs the LTE handover to the target BS in step 1505. When the HO control information from the serving BS is not received in step 1503, the electronic device returns to step 1501.

In step 1507, the electronic device maintains the VoLTE service. In this case, the electronic device provides the VoLTE service for the new incoming voice call or the new outgoing voice call via the target BS.

In step 1509, the electronic device determines whether the VoLTE service ends. For example, the electronic device determines whether every VoLTE service via the target BS ends. Here, the VoLTE service may include any voice call such as a holding voice call and a conference call.

When the VoLTE service of the electronic device does not end in step 1509, the electronic device maintains the VoLTE service in step 1507.

When the VoLTE service of the electronic device ends in step 1509, the electronic device determines whether the target BS supports the VoLTE service in step 1511. For example, the electronic device determines whether the IMS voice over PS session indication information which is the result of the TAU to the target BS after the LTE handover, is set to ON.

When the target BS supports the VoLTE service in step 1511, the electronic device maintains the VoLTE service mode in step 1513. For example, when the IMS voice over PS session indication information being the result of the TAU from the target BS is set to ON, the electronic device recognizes that the target BS accessed after the handover supports the VoLTE service.

When the target BS does not support the VoLTE service in step 1511, the electronic device switches to the non-VoLTE mode in step 1515. That is, when the area does not support the VoLTE service, the VoLTE service is limited in the electronic device. For example, when the IMS voice over PS session indication information being the result of the TAU from the target BS is set to OFF, the electronic device recognizes the non-VoLTE area where the target BS accessed after the handover does not support the VoLTE service. Hence, the electronic device ends the VoLTE service and then switches to the non-VoLTE mode. Here, the non-VoLTE mode may include any one of the CSFB mode, the dual-stack mode, and the LTE disable mode.

The methods as described in the claims and/or the specification of embodiments of the present invention can be implemented using hardware, software, or a combination of them.

As for the software, a computer-readable storage medium storing one or more programs (software modules) may be provided. One or more programs stored in the computer-readable storage medium may be configured for execution by one or more processors of a server or the electronic device. One or more programs include instructions for controlling the electronic device to execute the methods according to the embodiments as described in the claims and/or the specification of the present invention.

Such a program (software module, software) may be stored to a Random Access Memory (RAM), a non-volatile memory including a flash memory, a Read Only Memory (ROM), an Electrically Erasable Programmable ROM (EEPROM), a magnetic disc storage device, a Compact Disc (CD)-ROM, Digital Versatile Discs (DVDs) or other optical storage devices, and a magnetic cassette. Alternatively, the programs may be stored to a memory combining part or all of those recording media. A plurality of memories may be equipped.

The programs may be stored in an attachable storage device accessible via a communication network such as Internet, Intranet, Local Area Network (LAN), Wide LAN (WLAN), or Storage Area Network (SAN), or a communication network by combining these networks. The storage device can access the electronic device through an external port.

A separate storage device may access a portable electronic device over a communication network.

As set forth above, when the electronic device using the VoLTE service via the BS of the LTE network enters the non-VoLTE area (e.g., the LTE area not supporting the VoLTE service), the SRVCC is triggered to thus enhance the voice communication service quality.

When the electronic device in the VoLTE service enters the non-VoLTE area which supports the LTE handover but does not support the VoLTE service according to the service characteristics, the voice communication service quality can be enhanced by maintaining the VoLTE through the LTE handover.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method in an electronic device, the method comprising: providing a first voice over long term evolution (VoLTE) service in a first LTE area; handing over to a second LTE area supporting VoLTE during the first VoLTE service; receiving, from a base station of the second LTE area, information indicating whether at least a part of a VoLTE service of the second LTE area is limited; and limiting a VoLTE service in the electronic device, after the first VoLTE service is ended, in response to receiving the information indicating that the at least a part of the VoLTE service of the second LTE area is limited.

2. The method of claim 1, wherein handing over comprises:
   handing over from the first LTE area to the second LTE area while maintaining the first VoLTE service.

3. The method of claim 2, further comprising:
   determining the first VoLTE service of the electronic device is maintained in the second LTE area, in response to receiving the information indicating that the at least a part of the VoLTE service of the second LTE area is limited; and providing a second VoLTE service in the second LTE area while the first VoLTE service is maintained.

4. The method of claim 1, wherein handing over comprises:
handing over to the second LTE area based on handover control information received from the first LTE area.

5. The method of claim 1, further comprising:
after handing over to the second LTE area, performing Tracking Area Update (TAU) in the second LTE area.

6. The method of claim 5, wherein the information indicating whether the at least a part of the VoLTE service of the second LTE area is limited is received as a response of the TAU.

7. The method of claim 6, wherein the response of the TAU comprises Internet Protocol (IP) Multimedia Subsystem (IMS) voice over Packet Switched (PS) session indication information.

8. The method of claim 1, wherein limiting the VoLTE service comprises:
switching to any one of a Circuit Switched Fallback (CSFB) mode, a dual-stack mode, and an LTE disable mode.

9. The method of claim 1, further comprising:
maintaining a VoLTE service mode in the electronic device, in response to receiving the information indicating that the at least a part of the VoLTE service of the second LTE area is not limited.

10. An electronic device, comprising:
a communication module configured to provide a communication service via a long term evolution (LTE) network; and
a processor configured to, using the communication module, hand over from a first LTE area to a second LTE area during a first VoLTE service, to receive, from a base station of the second LTE area, information indicating whether a VoLTE service of the second LTE area is limited, and to limit a VoLTE service of the electronic device after the first VoLTE service is ended, in response to receiving the information indicating that the at least a part of the VoLTE service of the second LTE area is limited.

11. The electronic device of claim 10, wherein the processor is further configured to hand over from the first LTE area to the second LTE area while maintaining the first VoLTE service.

12. The electronic device of claim 11, wherein the processor is further configured to determine the first VoLTE service is maintained in the second LTE area, in response to receiving the information indicating that the at least a part of the VoLTE service of the second LTE area is limited, and to provide a second VoLTE service in the second LTE area while the first VoLTE service is maintained.

13. The electronic device of claim 10, wherein the processor is further configured to hand over to the second LTE area based on handover control information received from the first LTE area through the communication module.

14. The electronic device of claim 10, wherein, after handing over to the second LTE area, the processor is configured to perform Tracking Area Update (TAU) in the second LTE area.

15. The electronic device of claim 14, wherein the information indicating whether the at least a part of the VoLTE service of the second LTE area is limited is received as a response of the TAU.

16. The electronic device of claim 15, wherein the response of the TAU comprises Internet Protocol (IP) Multimedia Subsystem (IMS) voice over Packet Switched (PS) session indication information.

17. The electronic device of claim 10, wherein the processor is further configured to limit the VoLTE service by switching to any one of a Circuit Switched Fallback (CSFB) mode, a dual-stack mode, and an LTE disable mode.

18. The electronic device of claim 10, wherein the processor is further configured to maintain a VoLTE service mode, in response to receiving the information indicating that the at least a part of the VoLTE service of the second LTE area is not limited.

* * * * *